J. K. O'NEIL.
Gas Lamp.
No. 26,200. Patented Nov. 22, 1859.
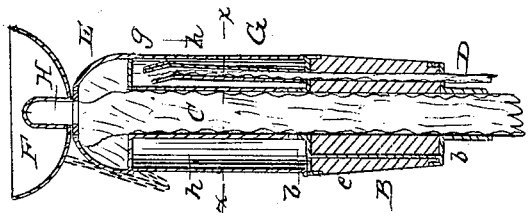
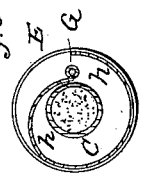
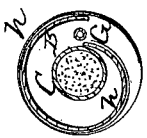
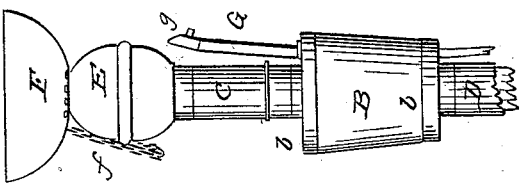
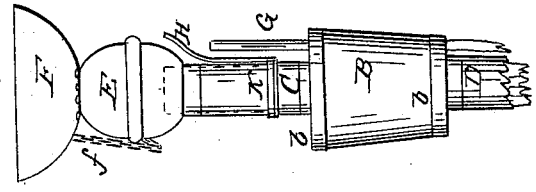
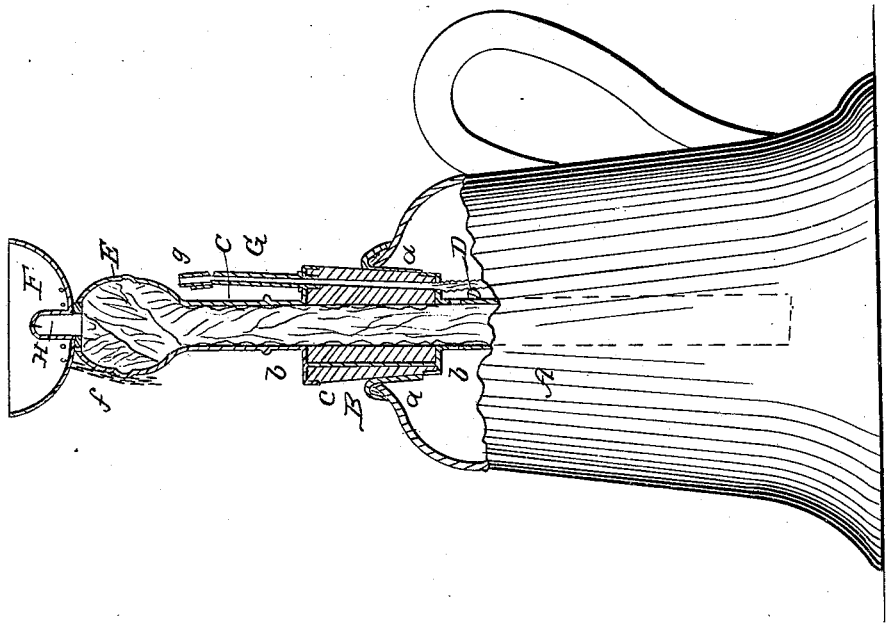
INVENTOR.
John K O'Neil

UNITED STATES PATENT OFFICE.

JOHN K. O'NEIL, OF KINGSTON, NEW YORK.

VAPOR-LAMP.

Specification of Letters Patent No. 26,200, dated November 22, 1859.

*To all whom it may concern:*

Be it known that I, JOHN K. O'NEIL, of Kingston, in the county of Ulster and State of New York, have invented certain new and useful Improvements in the Construction of Gas-Generating Lamps; and I do hereby declare that the following is a full and exact description thereof, reference being had to the accompanying drawings, making part of this specification.

Figure 1, is a central vertical section of a lamp-burner embodying most of my improvements, and mounted in a lamp or reservoir; Fig. 2, an elevation of said lamp-burner; Fig. 3, a central, vertical section of a lamp-burner exhibiting all my said improvements; Fig. 4, an elevation of a lamp-burner, showing a modification of one of the features; Fig. 5, a horizontal section in the plane indicated by the line x x, Fig. 3, looking upward; Fig. 6, a section in the same plane looking downward.

Like letters designate corresponding parts in all the figures.

My improvements relate to that class of lamps, in which is used a burning fluid sufficiently volatile to generate illuminating gas therefrom, in the burner itself, by the application of heat furnished from the light itself; and to that particular kind of gas-generating lamps in which an auxiliary light or small burner is employed to furnish the gas-generating heat required.

In the accompanying drawings, C, represents the main wick-tube, terminating in a closed chamber, or enlargement, E, of any convenient form. In this chamber the upper end of the main wick is coiled or packed; and the gas is generated in it from the fluid brought up by the capillary action of the wick from the lamp body or reservoir A, below. The gas escapes through the burner proper H, by which some heat is conducted from the combustion of the gas, down to the gas-generating chamber. But in the present arrangement, the effective heat for generating the gas is produced by means of a small auxiliary burner G, having a small separate wick extending down into the fluid in the reservoir. The heat from this burner is applied beneath the gas generating-chamber, and its light adds to the illuminating power of the whole lamp. The non-conduction of the heat of the burner down in to the fluid of the lamp is effected by the interposition of a non-conducting or imperfectly conducting substance between the wick-tube C, and the lamp body A, and lower, or wick-wetting tube D. The substance or material which I find most convenient and suitable for this use, is cork, its non-conducting property being sufficient for the purpose specified; while it serves the additional purpose of furnishing the connection between the lamp-burner and the lamp-body or reservoir. This cork B, may be somewhat conical, in form, as represented, so as always to fit tightly and firmly in the neck of the lamp body, made of corresponding shape. This neck a, may be the simple termination of the lamp body in the proper shape, or it may be a separate piece, made of the form shown in Fig. 1, and secured by cement or otherwise in the aperture of the lamp body. There may be different modes of attaching the tube C, D, to opposite ends of the cork non-conductor; the one represented is simple, effective and cheap. It consists in applying two metallic disks b, b, respectively to the ends of the cork, to which respectively the tubes are secured, and which are themselves attached to the cork by pins, or rods, c, c, passing through the cork from one disk to the other. The edges of these disks may have rims to embrace the ends of the cork as ferrules. The small rods c, c, do not conduct sufficient heat to produce any ill effect. Any other mode of uniting the parts may be adopted which may be preferred. This use and arrangement of the cork non-conductor and connector I find to be exceedingly effective and convenient.

One improvement in this lamp consists in separating at pleasure, the auxiliary burner G, from the gas-generating chamber E, so as not to apply the heat of the burner to the generation of gas; whereby the small burner may be used separately, without employing the main burner, whenever occasion may require, as for instance, when a night, or watcher's, lamp is required. This I effect, in general, in either one of two ways, the principle being the same in both. One way consists in moving the burner itself out of the range of its heating influence on the gas-generating chamber, as indicated by the device represented in Figs. 1, 2, and 3; and the other way consists in interposing a shield or screen between the burner and gas-generating chamber, as indicated by the device shown in Fig. 4. The simplest mode of employing the first method is by having the burner tube G, turn on its axis, and by having it so bent, or projecting in such a direction, that, by turning it one way, (as in Fig. 1,) it will be beneath the chamber E; and by turning it the opposite way, (as indicated in Fig. 2,) the flame will not act on the said chamber. The other mode, in its simplest arrangement, is applied by simply moving a strip of metal $k$, (Fig. 4,) between the burner G, and chamber E.

Another improvement consists in the application of a spiral revolving shade $h$, (Figs. 3, 5, and 6,) in connection with the auxiliary burner G, substantially as represented, so that by turning it in one direction, the inner edge of the shade will pass outside of the burner G, and hide the light from view. The ends of the shade may be guided in spiral grooves or spiral flanges, and the shade is made of such thin, flexible metal or material as to allow it to bend and assume the required variations of form. This device may be so arranged as also to fulfill the function of cutting off the action of the auxiliary burner from the gas-generating chamber, if desired.

I generally employ a flame guard F, around the main burner. This guard may be in the form of an inverted cup, as represented, or of any equivalent shape, the open side being upward. It has a central aperture, of the proper size to just fit over the burner H, and numbers of small holes near the same, to admit air from below, for supplying oxygen to the flame. The guard should reach a little higher than the top of the burner, just so as to protect the bottom of the jet or flame from the action of gusts of winds, or the motion of the air, but not high enough to shade or hide the light. It may have a chain L, to prevent its loss when removed from the burner, as it may be, when there is no necessity for its use. I also employ an improvement in the mode of varying the flame of the auxiliary burner G, for the purpose of varying the amount of gas generated in the chamber above, or of light produced. This consists in removing one side of the end of the burner G, either obliquely or abruptly, and placing a short tube $g$, of a similar shape, around the same. By turning this graduating tube $g$, into different positions more or less of the wick within, is exposed, and consequently a greater or smaller flame is produced. The effect of a constant flame from the auxiliary burner upon the gas-generating chamber, may be varied by adjusting the degree of its separation from said chamber, as above set forth.

What I claim as my invention and desire to secure by Letters Patent, is—

1. The arrangement of the auxiliary burner G, in connection with the gas-generating chamber E, in such a manner that a cessation of its action on said chamber may, at any time, be effected, without extinguishing its light, by the separation of said burner from its influence on said chamber, as described and for the purpose specified.

2. I also claim the spiral revolving shade $h$, in combination with the auxiliary burner, as described and for the purpose set forth.

3. I also claim the construction and arrangement of the burner G, and graduating tube $g$, in combination, as described and for the purpose specified.

In witness that the above is a true specification of my improvements in self-generating gas lamps, I hereunto set my hand this 25th day of March, 1859.

JOHN K. O'NEIL.

Witnesses:
J. S. BROWN,
Y. BAILY,
EDW. F. BROWN.